June 30, 1925.  
J. B. SMITH  
1,544,277  
AUTOMOBILE BED  
Filed Sept. 20, 1923
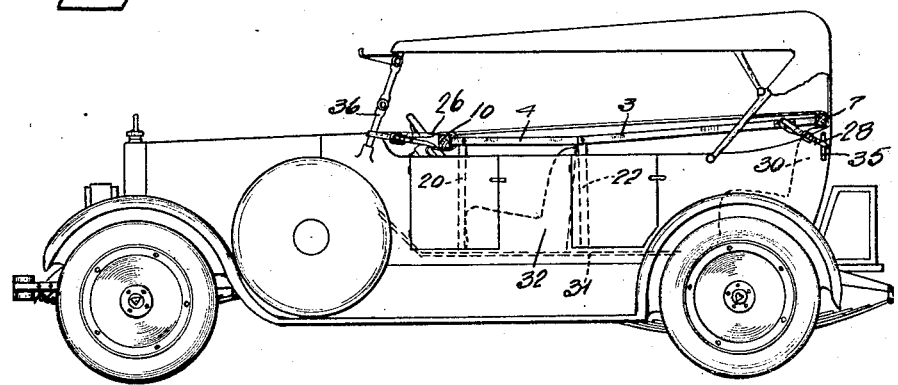
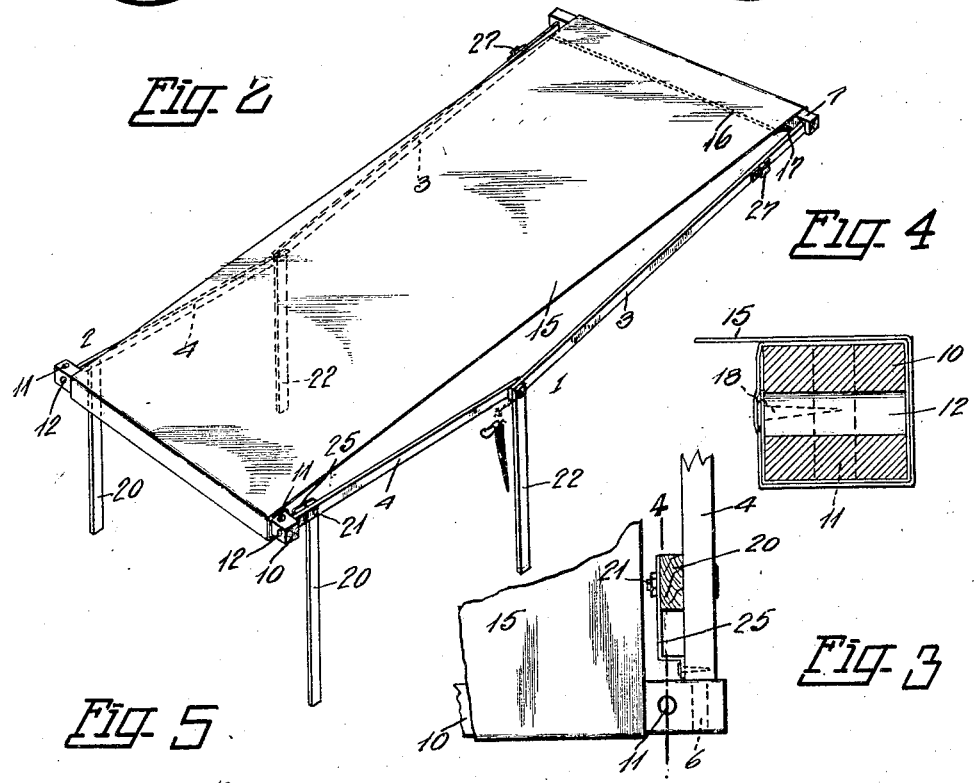
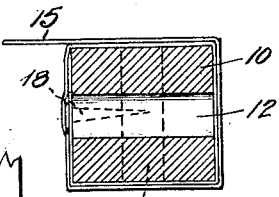
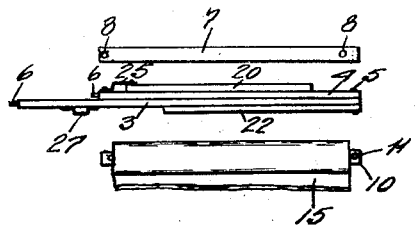
Inventor;
Joseph B. Smith,
By his Attorney,
Horace Barnes Patented June 30, 1925.

1,544,277

UNITED STATES PATENT OFFICE.

JOSEPH B. SMITH, OF PORTLAND, OREGON.

AUTOMOBILE BED.

Application filed September 20, 1923. Serial No. 663,799.

*To all whom it may concern:*

Be it known that I, JOSEPH B. SMITH, a citizen of the United States, residing at Portland, in the county of Multnomah and State of Oregon, have invented certain new and useful Improvements in Automobile Beds, of which the following is a specification.

My invention relates to improvements in folding beds for automobiles.

The object of my invention is the provision of a bed that may be mounted within an automobile, usually under the shelter of the car-top, where comfortable and stable sleeping accommodations may be provided without disarranging any portion of the car or its contents; which may be set up and taken down quickly and easily; and which when folded for carriage is extremely compact and light in weight.

A further object of the invention is the provision of a demountable and folding bed for automobiles having a skeleton frame and a bed fabric in sustaining relation so that the weight supported thereby tends to make the bed more stable and the bed fabric more fully stretched and proportionate.

It is the province of the invention to improve generally the class of inventions to which my improvements appertain and to render the same more widely useful and more economical in manufacture.

With the above and other objects in view, as will be seen in the course of the following description, the invention consists in the novel construction, arrangement and adaptation of a demountable and folding bed in combination with an automobile, as will be fully described in the following specification, illustrated in the accompanying drawings, and finally set forth in the appended claims.

In the accompanying drawings:

Figure 1 is a view in side elevation of an automobile including an embodiment of my invention shown mounted therein in operative condition.

Fig. 2 is a perspective view of my improved bed shown in assembled condition but detached from the car.

Fig. 3 is a fragmentary plan view of a corner of my improved bed.

Fig. 4 is a view in cross section on line 4—4 of Fig. 3.

Fig. 5 is a plan view of various parts of the bed disassembled and folded to illustrate the compactness of the bed when folded.

Referring to said views, wherein similar characters of reference indicate like parts in the several views, and which illustrate my improved automobile bed, said bed will be seen to consist in two jointed side rails 1 and 2, of relatively light and strong wood, each consisting in a section 3 and a shorter section 4 pivotally connected together with their broader sides arranged in overlapped position by bolt 5. At their opposite extremities said sections are each formed with a circular tenon 6 extended approximately in the longitudinal axis of the respective section.

A head-bar 7 is desirably of square configuration in cross section and is formed with a circular hole 8 therethrough adjacent each of its opposite ends and spaced apart to the width desired between the rails to receive the tenons 6 at one end of said rails. A foot-bar 10 is of similar construction except that it is provided with two pairs of holes 11 and 12 arranged at right angles to each other. The holes of each said pair at the opposite ends of the bar are spaced apart the same distance and the holes on the same end of the bar are spaced at different distances from the adjacent bar-end so that the bar will not be unduly weakened by the intersection of two holes.

Numeral 15 indicates the bed fabric, preferably consisting in a sheet of canvas or other suitable fabric turned upon itself at one end and sewed with a seam 16 to provide an open hem 17 the width of the fabric and of sufficient size to receive the head-bar 7 therethrough.

The opposite end of the bed fabric is secured along its edge to the foot-bar 10, as by tacks 18, and the canvas is desirably of such length that it may be rolled around said foot-bar for approximately one complete turn, to relieve said fastenings from all strain.

Each said rail is provided with a leg 20 pivotally secured by bolt 21 adjacent the outer extremity of rail-section 4, and another leg 22 is pivotally secured by the bolt 5 to the side of said overlapping connected ends of the rail-section opposite to that which the leg 20 is connected. Said legs may be of any suitable lengths to adapt the bed to any automobile into which it is to be used.

Metal loops 25 are secured at the extremities of the shorter rail-sections 4 to receive straps 26; and loops 27 are secured adjacent the opposite extremities of the sections 3 to receive straps 28.

The manner of assembling and employing my new bed may be described as follows: The bed is assembled as illustrated in Fig. 2 with the bar 7 extended through the open hem 17 of the canvas and the tenons 6 of the longer sections 3 entered into the holes 8 at each side. Said bar 7 is desirably supported upon or from the back 30 of the rear seat of the automobile in which used and the rails are extended therefrom forwardly in parallel relation. The rear legs 22 are disposed to rest upon the floor 31 of the car behind the front seat 32 while the front legs 20 rest upon the floor forwardly of the front seat, or upon the front seat with the cushion thereof removed, as may be most convenient. It is desirable that the legs 22 shall be of such length that the sections 3 will slope downwardly from their rest upon the back 30, while the forward legs 20 are of lengths to cause the sections 4 to slope upwardly from their joints with the rear sections and in obtuse angular relation therewith.

The bed fabric 15 through which the bar 7 is engaged is uncoiled from the bar 10 and brought forwardly to the ends of the rail-sections 4 and these are elevated at their forward ends at a sharper inclination and their tenons 6 entered into holes 11 or 12, as the case may be in order to give the desired amount of tension to the canvas when the side rails with the foot-bar attached are swung downwardly to operative position, as shown in the views. With the bar 10 engaged as described and the legs 20 resting upon the car-floor the canvas should be stretched between the bars 7 and 10 with considerable tension which is determined by the selected side of the bar 10 into which the tenons of the side rails are entered. With the canvas stretched in the manner described it will form the base of an inverted obtuse triangle whose sides are formed by the sections 3 and 4.

With the bed positioned thus in the car the straps 28 in the loops 27 are secured to the brackets 35 of the car or to some other suitable place, and the straps 26 in the loops 25 at the opposite ends of the rails are secured to the frame 36 of the windshield and thus the bed is secured in operative position from its four corners.

A quilt or blanket, not shown, may now be spread over the canvas 15 and the bed made thereon in the usual manner. It will be found that with the described arrangement with the side rails disposed in relatively flat obtuse triangular relation and with the canvas stretched thereabove that weights thereon, such as persons sleeping in the bed, will cause the bed to be all the more firmly held together. The weights upon the canvas have a toggle-like effect upon the rails to stretch the canvas and to maintain it in uniformly taut condition all the more potent through the nearly flat and parallel relation of the rails and canvas while the actual weight is largely borne at the opposite ends of the bed and to a lesser degree by the legs 22 wherethrough the thrust through the sections 3 and 4 is conveyed to the floor of the car. It is largely to this division and distribution of the stresses throughout the structure of the bed that the extreme lightness in which the component parts of the bed may be made is due.

It is obvious that the foot-bar 10 may be placed at the head of the bed where the bar 7 is shown in the views, and that the rails 1 and 2 are reversible and may be used on either side or in reversed position to that shown.

The compactness of the bed when folded is illustrated in Fig. 5 where one of the side rails is shown folded and the bars 7 and 10 shown detached. All of the parts may be rolled in the canvas 15 and secured with a strap, or they may be inserted in a bag, not shown, and will occupy but a very small space.

The device may be quickly and easily installed in a car, as will be seen from the foregoing description, and without removing anything from the car as the legs 22 extend straight downwardly from the rails in the corners between the back of the front seat and the rear side doors 37. The forward legs 20 extend into a space that is usually clear.

While I have described my invention with considerable detail I do not wish to be understood as confining the invention to the precise construction shown as obviously considerable variation and modification in detail may be resorted to within the scope of the claims and all such changes are contemplated and reserved as are within the spirit of the invention and such claims.

Having described my invention, what I claim is:—

1. An automobile bed, consisting in a pair of jointed side rails, each composed of a pair of sections, a bolt pivotally connecting said sections together at one end, a tenon extending from the opposite end of each said section, a head-bar formed with a hole adjacent each of its opposite ends to receive said tenons and secure an end of said rails in spaced relation, a foot-bar with two pairs of holes adjacent each of its ends to receive said tenons and disposed at right angles to each other at different distances from the proximate end of the bar, a bed-fabric formed with an open hem at one end to receive said head-bar therein, the opposite end of said fabric being secured at its extremity to said foot-bar and rolled thereabout, a leg pivotally connected at one end of each said rail, another leg pivotally connected to each said rail through said bolt, loops adjacent the opposite ends of said rails, and straps to secure said bed through said loops to the automobile.

2. An automobile bed, consisting in a pair of side rails, each composed of two sections hingedly connected together at one end and formed with a tenon at each of their other ends, a leg at one end of said rail and another leg at said hinge connection, a bar connecting in spaced relation one end of said rails having holes at opposite ends of the bar to receive said tenons, a bar connecting in spaced relation the other end of said rails and formed with two pairs of holes therethrough, the holes of each said pair being at opposite ends of the bar and disposed at right angles to the holes of the other pair, a bed-fabric secured to said last named bar and formed with an open hem to receive said first named bar, and means to secure said bed in operative position in an automobile.

3. An automobile bed, consisting in a pair of side rails, each said rail being composed of two sections higedly connected together, end bars detachably connected at opposite ends of said rails to form a rectangular frame, supports for said frame at its ends and also at its said hinged connections, a sheet of fabric stretched between said end bars, and means detachably connecting one of said bars and said rails affording adjustment in the length of said fabric between said bars.

JOSEPH B. SMITH.